United States Patent
Mitchell et al.

(10) Patent No.: US 7,186,441 B2
(45) Date of Patent: *Mar. 6, 2007

(54) PROCESSES FOR MANUFACTURING PARTICLES COATED WITH ACTIVATED LIGNOSULFONATE

(75) Inventors: Michael Donovan Mitchell, Cincinnati, OH (US); Blair Alex Owens, Cincinnati, OH (US); Dimitris Ioannis Collias, Mason, OH (US); Andrew Julian Wnuk, Wyoming, OH (US)

(73) Assignee: Pur Water Purification Products, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/771,778

(22) Filed: Feb. 4, 2004

(65) Prior Publication Data

US 2004/0219293 A1    Nov. 4, 2004

Related U.S. Application Data

(63) Continuation of application No. 09/832,580, filed on Apr. 11, 2001, now Pat. No. 6,733,827.

(51) Int. Cl.
*B05D 5/00* (2006.01)
*B05D 3/02* (2006.01)

(52) U.S. Cl. ............... 427/228; 427/220; 427/226
(58) Field of Classification Search ............... 427/228, 427/212, 392, 215, 245, 226, 256, 287, 288, 427/218, 220, 379, 380, 381, 382, 377, 286, 427/230, 384, 385.5, 391, 389.7, 393, 389.9, 427/394, 395, 396, 397

See application file for complete search history.

(56) References Cited

U.S. PATENT DOCUMENTS 3,650,834 A * 3/1972 Buzzelli ............... 429/112
3,811,947 A * 5/1974 Metcalfe et al. ............ 429/112

(Continued)

OTHER PUBLICATIONS

S.J. Gregg, et al., "Mesoporous Solids: The Type IV Isotherm", *Adsorption, Surface Area, and Porosity*, 1982, 138-143, 2nd Edition, Academic Press, Inc..

(Continued)

*Primary Examiner*—Fred J. Parker
(74) *Attorney, Agent, or Firm*—Paul M. Ulrich; Dinsmore & Shohl LLP; Kelly L. McDow-Dunham

(57) ABSTRACT

Processes for forming a filter material that includes coating a filter particle with a coating comprising a lignosulfonate, carbonizing the coating, and activating the coating. The filter particles may include a variety of filter particles, including but not limited to fibers, granules, and screens, and be formed from a variety of materials, such as metals, metal alloys, carbon, ceramic, or glass. Also, the lignosulfonate-coated filter particles may include a large amount of mesopore and/or macropore volume when carbonized and activated. One exemplary process for forming a filter material includes diluting ammonium lignosulfonate with water, mixing the solution with milled glass fibers, removing the excess lignosulfonate solution from the fibers, drying the lignosulfonate coated glass fibers at 65° C. for 12 h, carbonizing the coated glass fibers in a furnace ramped to 70° C. with a rate of 7° C./min for 30 min in a flowing nitrogen atmosphere, and activating the carbonized coated glass fibers in a furnace at 750° C. for 6 h in a flowing nitrogen/steam atmosphere.

17 Claims, 5 Drawing Sheets

U.S. PATENT DOCUMENTS

| | | | |
|---|---|---|---|
| 3,864,277 A * | 2/1975 | Kovach | 502/425 |
| 4,443,340 A | 4/1984 | May et al. | |
| 4,812,240 A | 3/1989 | Watts | |
| 5,024,783 A | 6/1991 | Busch et al. | |
| 5,204,310 A * | 4/1993 | Tolles et al. | 502/416 |
| 5,401,323 A | 3/1995 | Freese et al. | |
| 5,487,917 A * | 1/1996 | Gadkaree | 427/228 |
| 5,597,617 A * | 1/1997 | DeLiso et al. | 427/228 |
| 5,834,114 A * | 11/1998 | Economy et al. | 428/368 |
| 6,006,797 A * | 12/1999 | Bulow et al. | 141/3 |
| 6,024,899 A * | 2/2000 | Peng et al. | 264/29.1 |
| 6,372,289 B1 * | 4/2002 | Hickman | 427/228 |
| 6,733,827 B2 * | 5/2004 | Mitchell et al. | 427/228 |

OTHER PUBLICATIONS

E.P. Barrett, et al., "The Determination of Pore Volume and Area Distributions in Porous Substances", *The Volume and Area Distributions in Porous Substances*, 1951, 373-380, vol. 73.

* cited by examiner

PROCESSES FOR MANUFACTURING PARTICLES COATED WITH ACTIVATED LIGNOSULFONATE

CROSS REFERENCE TO RELATED APPLICATIONS

Pursuant to 35 U.S.C. § 120, this application is a continuation of U.S. application Ser. No. 09/832,580 filed Apr. 11, 2001, now U.S. Pat. No. 6,733,827, the substance of which is incorporated herein by reference.

FIELD OF THE INVENTION

The present invention relates to the field of processes for manufacturing particles coated with an activated lignosulfonate, and, more particularly, to the field of processes for manufacturing particles coated with an activated lignosulfonate for use in filters

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants must be removed before the water can be used. For example, in many medical applications and in the manufacture of certain electronic components, extremely pure water is required. As a more common example, any harmful contaminants must be removed from water before it is potable, i.e., fit to consume. Despite modem water purification means, the general population is at risk, and in particular infants and persons with compromised immune systems are at considerable risk.

In the U.S. and other developed countries, municipally treated water typically includes one or more of the following impurities: suspended solids, bacteria, parasites, viruses, organic matter, heavy metals, and chlorine. Breakdown and other problems with water treatment systems sometimes lead to incomplete removal of bacteria and viruses. In other countries, there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

In 1987, the U.S. Environmental Protection Agency (EPA) introduced the "Guide Standard and Protocol for Testing Microbiological Water Purifiers". The protocol establishes minimum requirements regarding the performance of drinking water treatment systems that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1\times10^7$ viruses per liter, and in the case of bacteria, the influent concentration should be $1\times10^8$ bacteria per liter. Because of the prevalence of Escherichia coli (E. coli, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

Due to these requirements and a general interest in improving the quality of potable water, there is a continuing desire to provide processes for manufacturing low cost filter materials, which are capable of removing bacteria and/or viruses from a fluid. Further, there is a continuing desire to provide processes for manufacturing such filter materials in the form of fibers in order to reduce the pressure differential needed to pass a fluid through the filter material.

SUMMARY OF THE INVENTION

Processes for forming a filter material are provided. A preferred process includes the steps of coating a filter particle with a lignosulfonate, carbonizing the coating, and activating the coating. Preferred lignosulfonates include ammonium lignosulfonate and zinc lignosulfonate. The coating can be applied to a variety of filter particles, including fibers, granules, and screens.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE PREFERRED EMBODIMENTS

1. Definitions

Figure 1:
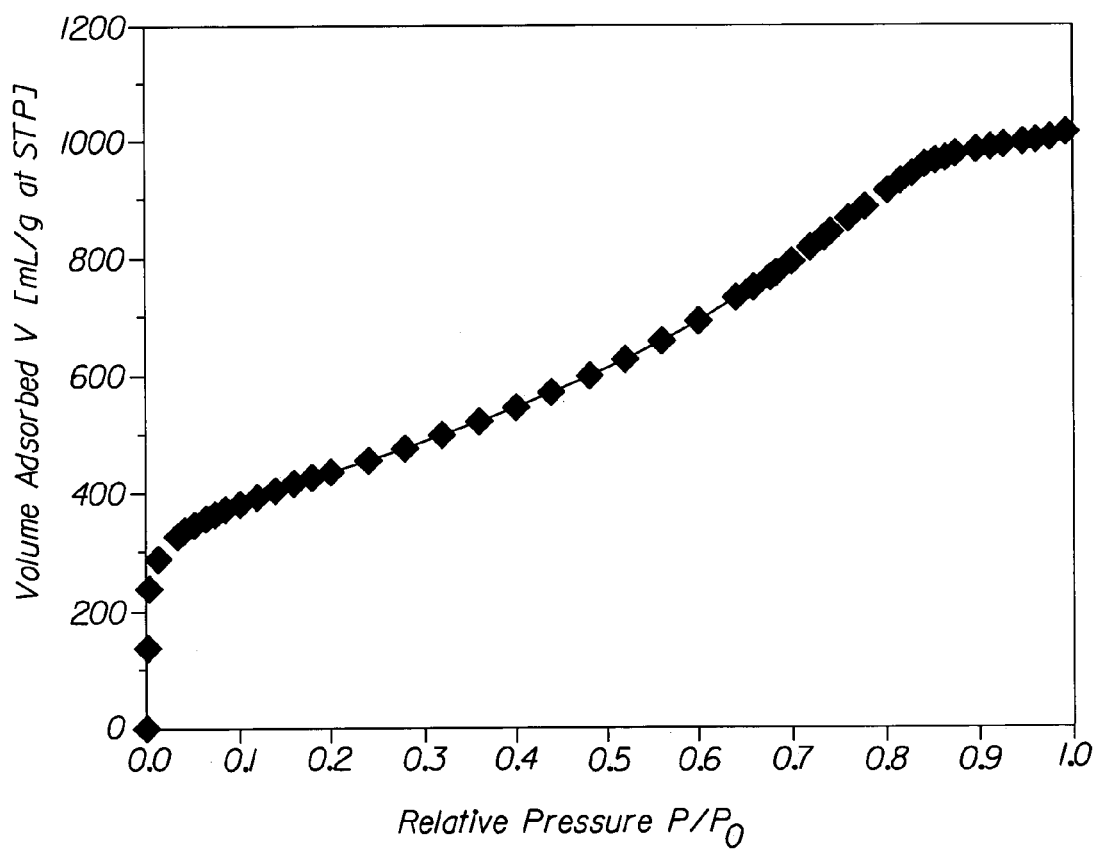
FIG. 1 is a BET nitrogen adsorption isotherm of glass fibers coated with an activated ammonium lignosulfonate in accordance with the present invention.

As used herein, the terms "filters" and "filtration" refer to structures and mechanisms, respectively, associated with microorganism removal, via either adsorption and/or size exclusion.

As used herein, the terms "microorganism", "microbiological organism" and "pathogen" are used interchangeably. These terms refer to various types of microorganisms that can be characterized as bacteria, viruses, parasites, protozoa, and germs.

As used herein, the phrase "Bacteria Removal Index" (BRI) of filter particles is defined as:

$BRI=100\times[1-(\text{bath concentration of } E.\ coli \text{ bacteria}$
$\text{at 6 hours})/(\text{control concentration of } E.\ coli$
$\text{bacteria at 6 hours})],$ wherein "bath concentration of *E. coli* bacteria at 6 hours" refers to the concentration of bacteria after 6 hours in a bath that contains a mass of filter particles having 1400 cm² of total external surface area, as discussed more fully hereafter. The phrase "control concentration of *E. coli* bacteria at 6 hours" refers to the concentration of *E. coli* bacteria after 6 hours in the control bath, and is equal to $1\times10^9$ CFU/L. Note that the term "CFU/L" denotes "colony-forming units per liter", which is a typical term used in *E. coli* counting. The BRI index is measured without application of chemical agents that provide bacteriocidal effects. An equivalent way to report the removal capability of filter particles is with the "Bacteria Log Removal Index" (BLRI), which is defined as:

$$BLRI=-\log[1-(BRI/100)].$$

The BLRI has units of "log" (where "log" stands for logarithm). For example, filter particles that have a BRI equal to 99.99% have a BLRI equal to 4 log. A test procedure for determining BRI and BLRI values is provided hereafter As used herein, the phrase "Virus Removal Index" (VRI) for filter particles is defined as:

$VRI=100\times[1-$(bath concentration of *MS*-2 phages at 6 hours)/(control concentration of *MS*-2 phages at 6 hours)], wherein "bath concentration of MS-2 phages at 6 hours" refers to the concentration of phages after 6 hours in a bath that contains a mass of filter particles having 1400 cm² total external surface area. The phrase "control concentration of MS-2 phages at 6 hours" refers to the concentration of MS-2 phages after 6 hours in the control bath, and is equal to $1\times10^7$ PFU/L. Note that the term "PFU/L" denotes "plaque-forming units per liter", which is a typical term used in MS-2 counting. The VRI index is measured without application of chemical agents that provide virucidal effects. An equivalent way to report the removal capability of filter particles is with the "Viruses Log Removal Index" (VLRI), which is defined as:

$$VLRI=-\log[100-(VRI/100)].$$

The VLRI has units of "log" (where "log" is the logarithm). For example, filter particles that have a VRI equal to 99.9% have a VLRI equal to 3 log. A test procedure for determining VRI and VLRI values is provided hereafter.

As used herein, the phrase "total external surface area" is intended to refer to the total geometric external surface area of the filter particles, as discussed more fully hereafter.

As used herein, the term "specific external surface area" is intended to refer to the total external surface area per unit mass of the filter particles, as discussed more fully hereafter.

As used herein, the term "micropore" is intended to refer to a pore having a width or diameter less than 2 nm (or equivalently, 20 Å).

As used herein, the term "mesopore" is intended to refer to a pore having a width or diameter between 2 nm and 50 nm (or equivalently, between 20 Å and 500 Å).

As used herein, the term "macropore" is intended to refer to a pore having a width or diameter greater than 50 nm (or equivalently, 500 Å).

As used herein, the phrase "pore volume" and its derivatives are intended to refer to the volume as measured by the BET method (ASTM D 4820-99 standard), which is well known to those-skilled in the art.

As used herein, the phrase "pore size distribution in the mesopore range" is intended to refer to the distribution of the pore size as calculated by the Barrett, Joyner, and Halenda (BJH) method, which is well known to those skilled in the art.

As used herein, the phrase "total pore volume" is intended to refer to the summation of the volumes of the micropores, mesopores, and macropores.

As used herein, the term "filter material" is intended to refer to an aggregate of filter particles. Filter particles forming a filter material need not be identical in shape, size, or composition. For example, a filter material might comprise granules coated with an activated lignosulfonate coating and non-coated activated carbon fibers.

As used herein, the phrase "filter particle" is intended to refer to an individual member or piece which forms at least part of a filter material. For example, a fiber, a granule, a bead, etc. are each considered filter particles herein. The filter particles can be coated or non-coated.

As used herein, the term "carbonization" and its derivatives are intended to refer to a process in which the non-carbon species in a carbonaceous substance are reduced.

As used herein, the term "activation" and its derivatives are intended to refer to a process in which a carbonized substance is rendered more porous.

As used herein, the phrase "total weight of a filter particle" and its derivatives are intended to refer to the weight of the filter particle, including its coating.

Other terms used herein are defined in the specification where discussed.

II. Filter Particles Coated with an Activated Lignosulfonate

Exemplary filter particles coated with an activated lignosulfonate will now be described. Unexpectedly it has been found that lignosulfonate-coated filter particles have a large amount of mesopore and/or macropore volume when carbonized and activated. Although not wishing to be bound by any theory, it is hypothesized that the large number of mesopores and/or macropores provide more convenient adsorption sites for the pathogens, their fimbriae, and surface polymers (e.g. proteins, lipopolysaccharides, carbohydrates and polysaccharides) that constitute the outer membranes, capsids and envelopes of the pathogens. This enhanced adsorption might be attributed to the fact that the typical size of the fimbriae, and surface polymers is similar to that of the mesopores and macropores.

The filter particles can be provided in a variety of shapes and sizes. For example, the filter particles can be provided in simple forms such as granules, fibers, and beads. The filter particles can be provided in the shape of a sphere, polyhedron, cylinder, as well as other symmetrical, asymmetrical, and irregular shapes. Further, the filter particles can also be provided in complex forms such as webs, screens, meshes, non-wovens, and wovens, which may or may not be formed from the simple forms described above.

Like shape, the size of the filter particle can also vary, and the size need not be uniform among filter particles used in any single filter. In fact, it can be desirable to provide filter particles having different sizes in a single filter. Generally, the size of the filter particles is between about 0.1 μm and about 10 mm, preferably between about 0.2 μm and about 5 mm, more preferably between about 0.4 μm and about 1 mm, and most preferably between about 1 μm and about 500 μm. For spherical and cylindrical particles (e.g., fibers, beads, etc.), the above-described dimensions refer to the diameter of the filter particles. For filter particles having substantially different shapes, the above-described dimensions refer to the largest dimension (e.g., length, width, or height).

The filter particles can be formed from a variety of materials, such as metals, metal alloys, carbon, ceramic or glass. Some typical examples of filter particle materials are: glass fibers, ceramic fibers, carbon fibers, and copper granules. Examples of suitable glass fibers are milled glass fibers 15.8 μm in diameter and 1.6 mm (1/16″) in length from Owens Corning, Inc., of Toledo, Ohio, with the following notations: 1) 731ED, that contain cationic sizing; 2) 737BD, that contain silane sizing, and 3) 739DD, that are unsized. Other examples of glass fibers are CRATEC® chopped strands from Owens Corning, Inc., and MICROSTRAND® glass microfibers from Johns Manville International, Inc., of Denver, Colo. Examples of glass fiber webs are the surfacing veils C64, C33, ECR30A and ECR30S from Owens Corning, Inc, microfiber glass filter papers 8000130, 8000100, and HD-2233 from Hollingsworth & Vose Company of East Walpole, Mass., and glass fiber papers grade 151 and 164 from A. Ahlstrom Corporation of Helsinki, Finland.

Examples of suitable ceramic fibers are INSULFRAX® and FIBERFRAX® from Unifrax Corporation of Niagara Falls, N.Y., REFRASIL® from Hitco Carbon Composites of Gardena, Calif., and NICALON® from Nippon Carbon Co., Ltd, of Tokyo, Japan. Examples of ceramic webs are FIBEP-FRAX® papers, such as 550, 882-H, and 972-H, from Unifrax Corporation. Examples of carbon fibers are polyacrylonitrile (PAN) and pitch-based THORNEL fibers from BP Amoco Polymers, Inc., of Alpharetta, Ga., and FORTA-FIL® OPF from Fortafil Fibers, Inc., of Rockwood, Tenn. Copper and brass screens can also be used.

At least some of the filter particles forming a filter material are coated with a lignosulfonate to provide the carbon source during the subsequent steps of carbonization and activation of the filter particles. As used herein, the term "coated" means either continuous or discontinuous, i.e., the coating can completely cover the surface of the filter particle or covers only a portion so that it forms areas of coverage (e.g. "islands") and areas of no coverage. While the coatings of the present invention contain lignosulfonate, it is contemplated that the coatings can also comprise other substances. For example, the coatings might contain 90% by weight lignosulfonate and 10% by weight starch. Other substances can include, but are not limited to, kraft lignin, organosolv lignin, amine lignin, sugar, xylan, cyclodextrin, sodium silicate, chitosan, cellulose acetate, carboxymethyl cellulose, carboxyethyl cellulose, polyvinyl acetate, phenolic resin, polystyrene, polyacrylonitrile, polyethylene terephthalate, pitch, asphalt, acetal, vinyl polymers, acrylic polymers, polyamide epichlorohydrin, polyethylene oxide, polypropylene oxide, polyvinyl methyl ether, polyethylene imine, polyacrylamide, polyvinyl alcohol, polyvinyl pyrrolidone, polyacrylic acid, polyvinyl pyridine, and mixtures thereof.

A particularly preferred lignosulfonate is ammonium lignosulfonate (AL). As known in the art, ammonium lignosulfonate is a sulfonate salt, which is by-product of either the acid sulfite pulping process or the chemi(thermo)mechanical (CTMP) pulping. During the pulping process, the lignin in the wood chips (from either hardwood or softwood) is subjected to reaction with an aqueous bisulfite salt at elevated temperature and pressure, and is rendered water soluble by depolymerization and sulfonation reactions. Both reactions typically take place in the a-position in the propane side chain of the lignin molecule, and the resulting lignosulfonate molecule contains one sulfonate group per two phenylpropane units, as shown by way of example in formula 1 below.

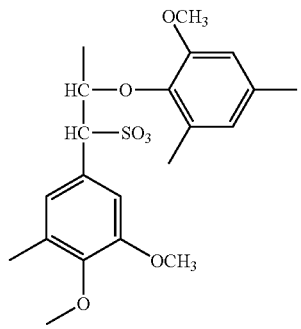

Formula 1

The typical weight average molecular weight of the ammonium lignosulfonate is about 30,000, and its number average molecular weight is about 3,000. The resulting lignosulfonate is dissolved in the spent sulfite pulping liquor along with a variety of carbohydrates that are formed by degradation of the hemicellulose components of the wood.

The AL can be provided as a powder, a dispersion, or a solution. Examples of AL solutions are LIGNOSITE® 1740 from Georgia-Pacific West, Inc., of Bellingham, Wash., NORLIG TSFL and NORLIG TSFL-4 from Borregaard LignoTech, Inc., of Rothschild, Wis., and Weschem AS from Wesco Technologies, Ltd., of San Clemente, Calif. The LIGNOSITE® 1740 solution contains 48±2% by weight total solids, more than 60% of which is AL solids. The Weschem AS dry solids contain more than 57% lignosulfonate and more than 24% reducing sugars by weight.

Other lignosulfonate powders, dispersions or solutions can be used in place of ammonium lignosulfonate. For example, calcium lignosulfonate (CaLS), zinc lignosulfonate (ZL), ferric lignosulfonate (FL), chromium lignosulfonate (CrL), magnesium lignosulfonate (MgL), sodium lignosulfonate (NaLS), copper lignosulfonate (CuLS), and manganese lignosulfonate (MnL) can be used. Examples of zinc lignosulfonates are: in solution form, Weschem Zn from Wesco Technologies, Ltd.; and in powder form, Zinc KE-MIN® micronutrient lignosulfonate from Georgia-Pacific West, Inc., and NORLIG® Zn from Borregaard LignoTech, Inc. Mixtures of the various lignosulfonates can also be used.

The filter particles can be coated with AL using one of many techniques known in the art. For example and not by way of limitation, some ways to coat filter particles are: 1) dispersing the filter particles in the AL solution; 2) submerging the filter particles into the AL solution, 3) spraying the AL solution onto the filter particles with the use of typical spraying equipment, such as, but not limited to, trigger sprayers, aerosol generators and electrostatic sprayers; and 4) using typical coating equipment and practices, such as, but not limited to, roll coating, rod coating and pressure saturation.

Following application of the AL coating, the coated filter particles can be dried using various methods known to those skilled in the art. For example and not by way of limitation, some methods to achieve drying are: 1) placing the coated filter particles in a convection oven at a temperature of about 100° C.; 2) placing the coated filter particles on air flotation dryers; and 3) infrared (IR) heating. The weight percent of the coating, which is also referred to as "coating add-on", is measured after drying and is calculated as the ratio of the weight of the coating to the total weight of the filter particle (i.e., the weight of the filter particle including the coating). The coating add-on is between about 0.5% and about 97% of the total weight of the filter particle and, in an alternate embodiment, is between about 0.6% and about 90% of the total weight of the filter particle. In another embodiment, the coating add-on is between about 1% and about 80%, or between about 4% and about 70% of the total weight of the filter particle.

Carbonization of the coated filter particles is achieved in furnaces. The carbonization conditions include temperature, time and atmosphere, and these conditions can be varied as typically known to those skilled in the art. Exemplary carbonization conditions will now be described. In the one process of the present invention, the carbonization temperature is between about 500° C. and about 1000° C., preferably is between about 600° C. and about 900° C., more preferably is between about 630° C. and about 800° C., and most preferably is between about 680° C. and about 750° C. The carbonization time can be between 2 minutes and 5 hours, preferably between about 5 minutes and about 3 hours, more preferably between about 10 minutes and about 1.5 hours, and most preferably between about 20 minutes and about 40 min. The carbonization atmosphere can include inert gases or nitrogen and their flow rate can be between about 2.5 standard L/h.g (i.e., standard liters per hour and gram of carbon in the coating; 0.09 standard ft$^3$/h.g) and about 600 standard L/h.g (21.12 standard ft$^3$/h.g), preferably between about 5 standard L/h.g (0.18 standard ft$^3$/h.g) and about 300 standard L/h.g (10.56 standard ft$^3$/h.g), more preferably between about 10 standard L/h.g (0.36 standard ft$^3$/h.g) and about 200 standard L/h.g (7.04 standard ft$^3$/h.g), and most preferably between about 50 standard L/h.g (1.76 standard ft$^3$/h.g) and about 100 standard L/h.g (3.52 standard ft$^3$/h.g). The weight percent of carbon in the carbonized coating, which is also referred to as "carbon add-on in the carbonized coating", is calculated as the ratio of the weight of the carbon in the carbonized coating to the total weight of the filter particle (i.e., the weight of the filter particle including the carbonized coating). The carbon add-on in the carbonized coating is between about 0.2% and about 95% and, in an alternate embodiment, is between about 0.3% and about 85% of the total weight of the filter particle. In another embodiment, the carbon add-on in the carbonized coating is between about 0.5% and about 70% or between about 1% and about 60% of the total weight of the filter particle.

Activation of the carbonized, coated filter particles can next be done in a furnace. The activation conditions include temperature, time and atmosphere, and these conditions can be varied as typically known to those skilled in the art. Exemplary activation conditions will now be described. In one process of the present invention, the activation temperature can be between about 550° C. and about 1300° C., preferably between about 600° C. and about 1200° C., more preferably between about 650° C. and about 1000° C., and most preferably between about 700° C. and about 900° C. The activation time can be between about 3 minutes and about 12 hours, preferably between about 5 minutes and about 10 hours, more preferably between about 30 minutes and about 8 hours, and most preferably between about 2 hours and about 7 hours. Examples of activation atmospheres are (but not limited to) mixtures of oxidants and carrier gases such as, steam and nitrogen, carbon dioxide and nitrogen, carbon dioxide and steam, etc. The steam flowrate can be between about 0.005 mL/min.g (i.e., milliliter per minute and gram of carbon in the carbonized coating) and about 15 mL/min.g, preferably between about 0.01 mL/min.g and about 10 mL/min.g, more preferably between about 0.05 mL/min.g and about 5 mL/min.g, and most preferably between about 0.1 mL/min.g and about 1 mL/min.g. The weight percent of carbon in the activated coating, which is also referred to as "carbon add-on in the activated coating", is calculated as the ratio of the weight of the carbon in the activated coating to the total weight of the filter particle (i.e., the weight of the filter particle including the activated coating). In one embodiment, the carbon add-on in the activated coating is less than about 85% or less than about 75%. In another embodiment, the carbon add-on in the activated coating is between about 0.1% and about 85% and, in an alternate embodiment, is between about 0.2% and about 75% of the total weight of the filter particle. In another embodiment, the carbon add-on in the activated coating is between about 0.3% and about 60% or between about 0.5% and about 45% of the total weight of the filter particle.

The Brunauer, Emmett and Teller (BET) specific surface area and the Barrett, Joyner, and Halenda (BJH) pore size distribution can be used to characterize the pore structure of the coated, activated filter particles. The BET specific surface area is measured according to ASTM D 4820-99 standard by multipoint nitrogen adsorption. These methods can also provide the micropore, mesopore, and macropore volumes. The BJH pore size distribution is measured according to Barrett, Joyner, and Halenda (BJH) method, which is described in *J. Amer. Chem. Soc.*, 73, 373-80 (1951) and Gregg and Sing, ADSORPTION, SURFACE AREA, AND POROSITY, 2nd edition, Academic Press, New York (1982), the substances of which are incorporated herein by reference. Both methodologies are well known in the art.

Preferably, the BET specific surface area of the filter particles coated with an activated lignosulfonate is between about 500 m$^2$/g (g refers to the mass of the carbon in the activated coating) and about 3,000 m$^2$/g, preferably between about 600 m$^2$/g to about 2,800 m$^2$/g, more preferably between about 800 m$^2$/g and about 2,500 m$^2$/g, and most preferably between about 1,000 m$^2$/g and about 2,000 m$^2$/g. Referring to FIG. 1, a typical nitrogen adsorption isotherm, using the BET method, of a glass fiber coated with an activated ammonium lignosulfonate is illustrated.

The total pore volume is measured during the BET nitrogen adsorption and is calculated as the volume of nitrogen adsorbed at a relative pressure, $P/P_0$, of 0.9814. The total pore volume of filter particles coated with an activated lignosulfonate is between about 0.4 mL/g (g refers to the mass of the carbon in the activated coating) and about 3 mL/g, preferably between about 0.5 mL/g and about 2.8 mL/g, more preferably between about 0.7 mL/g and about 2.5 mL/g, and most preferably between about 0.8 mL/g and about 2 mL/g. The sum of the mesopore and macropore volumes is measured during the BET nitrogen adsorption and calculated as the difference between the total pore volume and the volume of nitrogen adsorbed at $P/P_0$ of 0.15. The sum of the mesopore and macropore volumes of filter particles coated with an activated lignosulfonate is between about 0.2 mL/g (g refers to the mass of the carbon in the activated coating) and about 2.2 mL/g, preferably between about 0.25 mL/g and about 2 mL/g, more preferably between about 0.3 mL/g and about 1.7 mL/g, and most preferably between about 0.4 mL/g and about 1.5 mL/g.

In one embodiment, the pore volume is at least about 0.01 mL/g (g refers to the mass of the carbon in the activated coating) for any pore diameter between about 4 nm and about 6 nm. In alternate embodiment, the pore volume is between about 0.01 mL/g and about 0.04 mL/g for any pore diameter between about 4 nm and about 6 nm. In yet another embodiment, the pore volume is at least about 0.06 ml/g for pore diameters between about 4 nm and about 6 nm or is between about 0.06 ml/g and about 0.15 ml/g. In a preferred embodiment, the pore volume is between about 0.07 ml/g and about 0.15 ml/g for pore diameters between about 4 nm and about 6 nm.

Figure 2:
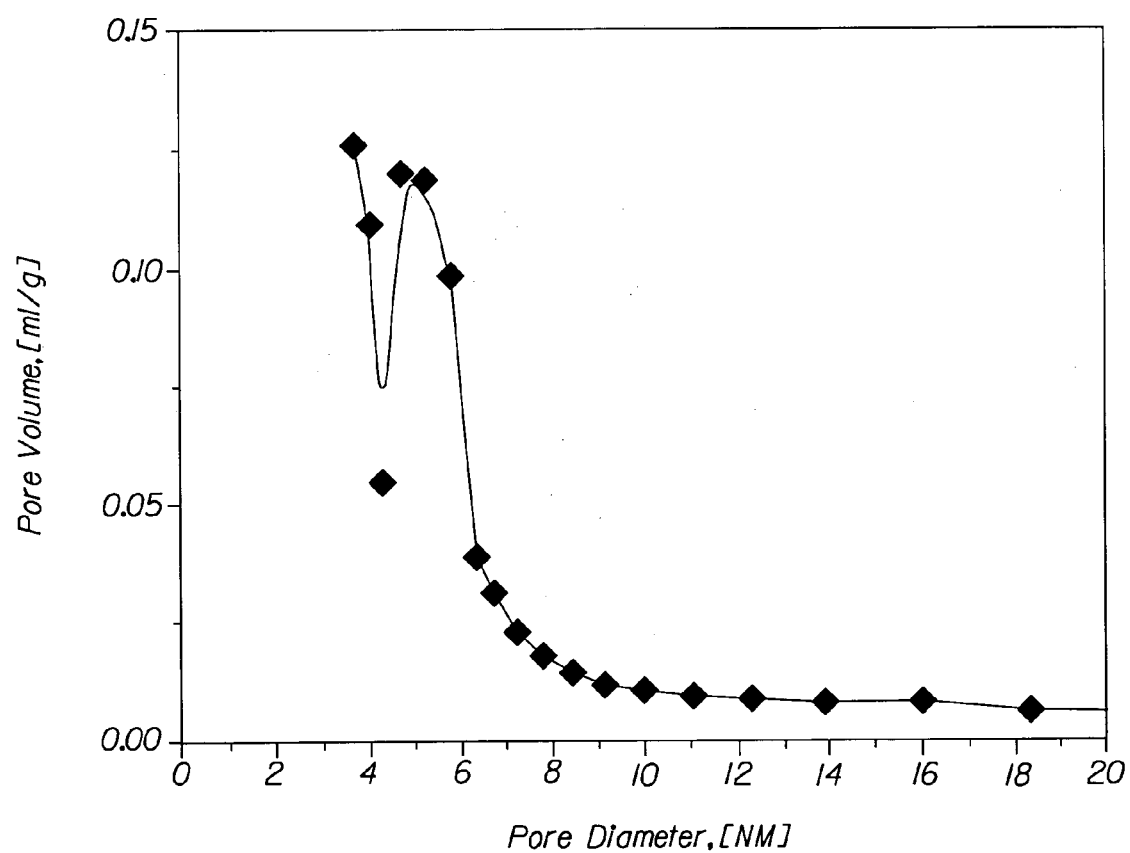
FIG. 2 is a mesopore volume distribution of the glass fibers of FIG. 1.

The ratio of the sum of the mesopore and macropore volumes to the micropore volume is between about 0.3 and about 3, preferably between about 0.5 and about 2, more preferably between about 0.65 and about 1.7, and most preferably between about 0.8 and about 1.5. Referring to FIG. 2, a typical mesopore volume distribution, as calculated by the BJH method, for a glass fiber coated with activated ammonium lignosulfonate is illustrated.

The total external surface area is calculated by multiplying the specific external surface area by the mass of the coated filter particles, and is based on the dimensions of the coated filter particles. For example, the specific external surface area of mono-dispersed (i.e., with uniform diameter) fibers is calculated as the ratio of the area of the fibers (neglecting the 2 cross sectional areas at the ends of the fibers) and the weight of the fibers. Thus, the specific external surface area of the fibers is equal to: $4/D\rho$, where D is the fiber diameter and $\rho$ is the fiber density. For monodispersed spherical particles, similar calculations yield the specific external surface area as equal to: $6/D\beta$, where D is the particle diameter and $\beta$ is the particle density. For poly-dispersed fibers, spherical or irregular particles, the specific external surface area is calculated using the same respective formulae as above after substituting $\overline{D}_{3,2}$ for D, where $\overline{D}_{3,2}$ is the Sauter mean diameter, which is the diameter of a particle whose surface-to-volume ratio is equal to that of the entire particle distribution. A method, well known in the art, to measure the Sauter mean diameter is by laser diffraction, for example using the Malvern equipment (Malvern Instruments Ltd., Malvern, U.K.). The specific external surface area of the coated filter particles is between about 10 $cm^2/g$ (g refers to the mass of the filter particle, including the coating) and about 100,000 $cm^2/g$, preferably between about 50 $cm^2/g$ and about 50,000 $cm^2/g$, more preferably between about 100 $cm^2/g$ and about 10,000 $cm^2/g$, and most preferably between about 500 $cm^2/g$ and about 5,000 $cm^2/g$.

The BRI of the filter particles coated with an activated lignosulfonate, when measured according to the batch test procedure set forth herein, is greater than about 99%, preferably greater than about 99.9%, more preferably greater than about 99.99%, and most preferably greater than about 99.999%. Equivalently, the BLRI of the filter particles coated with an activated lignosulfonate is greater than about 2 log, preferably greater than about 3 log, more preferably greater than about 4 log, and most preferably greater than about 5 log. The VRI of filter particles coated with an activated lignosulfonate, when measured according to the batch test procedure set forth herein, is greater than about 90%, preferably greater than about 95%, more preferably greater than about 99%, and most preferably greater than about 99.9%. Equivalently, the VLRI of the filter particles coated with an activated lignosulfonate is greater than about 1 log, preferably greater than about 1.3 log, more preferably greater than about 2 log, and most preferably greater than about 3 log.

In one preferred embodiment of the present invention, the filter particles comprise glass fibers coated with activated ammonium lignosulfonate. These fibers have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

In another preferred embodiment of the present invention, the filter particles comprise ceramic fibers coated with activated ammonium lignosulfonate. These fibers have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

In yet another preferred embodiment of the present invention, the filter particles comprise glass fibers coated with activated zinc lignosulfonate. These fibers have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

The following non-limiting examples are intended to illustrate manufacture of filter materials of the present invention.

EXAMPLE 1

Glass Fibers Coated with Activated Ammonium Lignosulfonate 250 mL of LIGNOSITE® 1740 ammonium lignosulfonate (AL) solution from Georgia-Pacific West Inc., of Bellingham, Wash., is diluted with 250 mL of water, and then mixed with 150 g of milled glass fibers 737BD 1/16" (1.6 mm) in length manufactured by Owens Corning, Inc., of Toledo, Ohio, in an 800 mL beaker for 5 min with gentle stirring. Excess ammonium lignosulfonate solution is removed from the coated glass fibers using a standard Buchner funnel. The ammonium lignosulfonate coated glass fibers are then dried at 65° C. for 12 h.

For the carbonization step, the coated glass fibers are placed inside a Lindberg/Blue M horizontal tube furnace Model # HTF55667C manufactured by SPX Corp., of Muskegon, Mich. The furnace temperature is ramped to 700° C. with a rate of 7° C./min, and the carbonization goes on for 30 min in a flowing nitrogen atmosphere with a nitrogen volumetric flowrate of 30 standard $ft^3/h$ (850 L/h).

The carbonized coated glass fibers are then activated in the same tube furnace at 750° C. for 6 h in a flowing nitrogen/steam atmosphere. The nitrogen flowrate is 15 standard $ft^3/h$ (425 L/h), and the water flowrate is 20 mL/min.

EXAMPLE 2

Glass Fibers Coated with Activated Zinc Lignosulfonate 50 g of powder Zinc KE-MIN® micronutrient lignosulfonate (ZL) from Georgia-Pacific West Inc., of Bellingham, Wash., are dissolved in 200 mL of water. The ZL solution is then mixed with 130 g of milled glass fibers 737BD 1/16" (1.6 mm) in length manufactured by Owe,is Corning, Inc., of Toledo, Ohio, in an 800 mL beaker for 5 min with gentle stirring. Excess zinc lignosulfonate solution is removed from the coated glass fibers using a standard Buchner funnel. The zinc lignosulfonate coated glass fibers are then dried at 65° C. for 12 h.

For the carbonization step, the coated glass fibers are placed inside a Lindberg/Blue M horizontal tube furnace Model # HTF55667C (SPX Corp.; Muskegon, Mich.). The furnace temperature is ramped to 700° C. with a rate of 7°

C./min, and the carbonization goes on for 30 min in a flowing nitrogen atmosphere with a nitrogen volumetric flowrate of 30 standard ft³/h (850 L/h).

The carbonized coated glass fibers are then activated in the same tube furnace at 750° C. for 6 h in a flowing nitrogen/steam atmosphere. The nitrogen flowrate is 15 standard ft³/h (425 L/h), and the water flowrate is 20 mL/min.

III. Filters of the Present Invention

Figure 3:
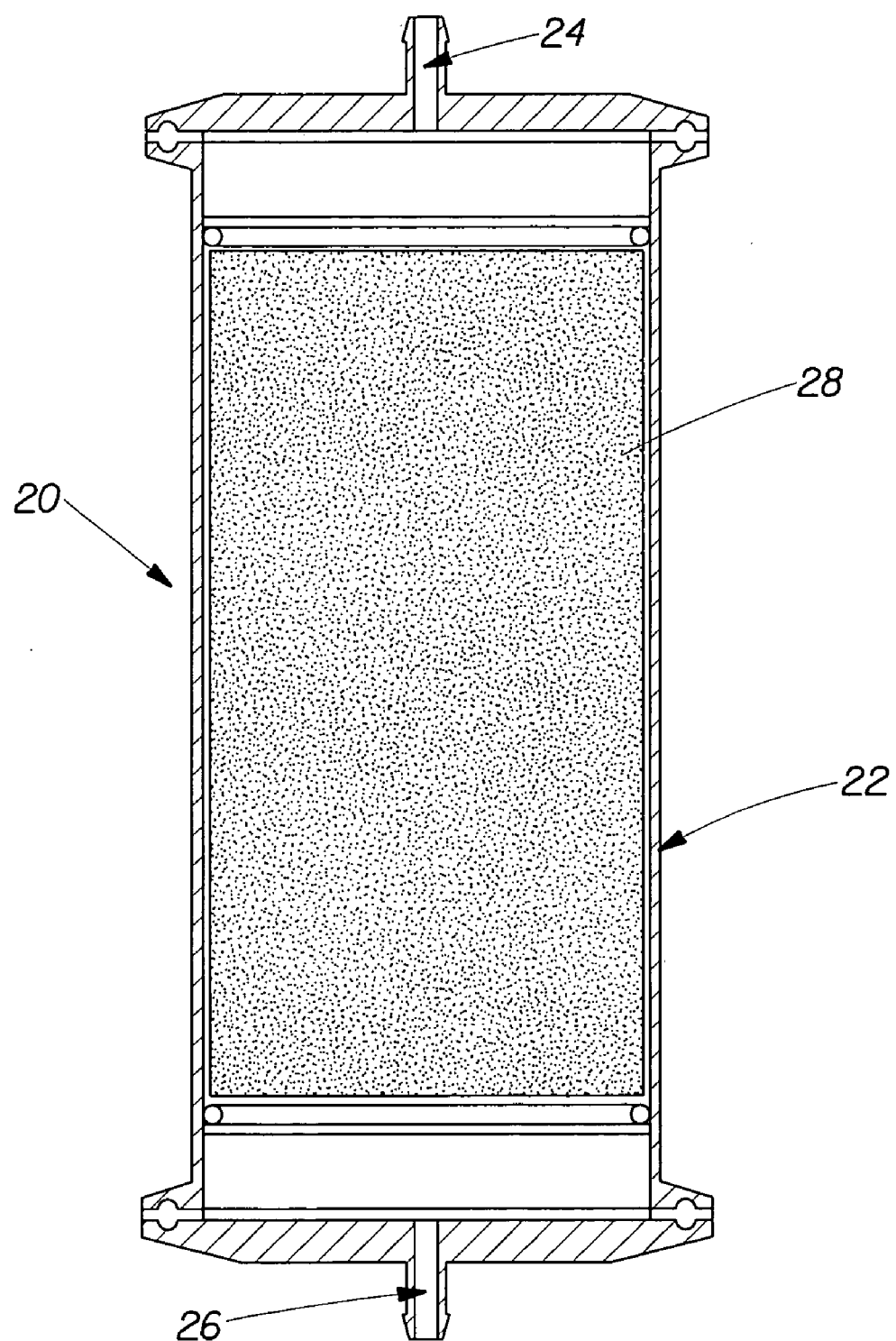
FIG. 3 is a cross sectional side view of an axial filter made in accordance with the present invention.

Referring to FIG. 3, an exemplary filter made in accordance with the present invention will now be described. The filter 20 comprises a housing 22 in the form of a cylinder having an inlet 24 and an outlet 26. The housing 22 can be provided in a variety of forms depending upon the intended use of the filter. For example, the filter can be an axial flow filter, wherein the inlet and outlet are disposed so that the liquid flows along the axis of the housing. Alternatively, the filter can be a radial flow filter wherein the inlet and outlet are arranged so that the fluid. (e.g., either a liquid, gas, or mixture thereof) flows along a radial of the housing. Still further, the filter can include both axial and radial flows. While the filters of the present invention are particularly suited for use with water, it will be appreciated that other fluids (e.g., air, gas, and mixtures of air and liquids) can be used. The size, shape, spacing, alignment, and positioning of the inlet 24 and outlet 26 can be selected, as known in the art, to accommodate the flow rate and intended use of the filter 20. The filter 20 also comprises a filter material 28, wherein the filter material 28 includes one or more filter particles (e.g., fibers, granules, etc.). One or more of the filter particles can be coated with an activated lignosulfonate and possess the characteristics previously discussed. The filter material can also comprise uncoated particles and particles formed from other materials, such as carbon powders, activated carbon granules, activated carbon fibers, zeolites, and mixtures thereof.

IV. Test Procedures

The following test procedures are used to calculate the BRI/BLRI, values, the VRI/VLRI values, and the BET values discussed herein. While measurement of the BRI/BLRI and VRI/VLRI values is with respect to an aqueous medium, this is not intended to limit the ultimate use of filter materials of the present invention, but rather the filter materials can ultimately be, used with other fluids as previously discussed even though the BRI/BLRI and VRI/VLRI values are calculated with respect to an aqueous medium. Further, the filter materials chosen below to illustrate use of the test procedures are not intended to limit the scope of the manufacture and/or composition of the filter materials of the present invention or to limit which filter materials of the present invention can be evaluated using the BRI/BLRI and VRI/VLRI test procedures.

Carbon Add-on and BET Test Procedures

The carbon add-on in the activated coating of the filter material can be measured thermo gravimetrically using a Hi-Res Modulated TGA 2950 manufactured by TA Instruments, Inc. of New Castle, Del. The TGA final temperature is set to 650° C., and the ramp is set to 50° C./min. The carbon add-on in the activated coating of the filter materials of Examples 1 and 2 are about 1.7% and about 0.9%, respectively. The BET specific surface area and pore volume distribution are measured using the nitrogen adsorption technique at 77K with a Coulter SA3100 Series Surface Area and Pore Size Analyzer manufactured by Coulter Corp., of Miami, Fla. For the filter material of Example 1, the BET area is 1,472 m²/g, micropore volume is 0.61 mL/g, and the sum of the mesopore and macropore volumes is 0.86 mL/g. Typical BET nitrogen isotherm and the pore volume distribution for the filter material of Example 1 are illustrated in FIGS. 1 and 2, respectively. For the filter material of Example 2, the BET area is 1,631 m²/g, micropore volume is 0.72 mL/g, and the sum of the mesopore and macropore volumes is 0.67 mL/g. As will be appreciated, other instrumentation can be substituted for the TGA and BET measurements as is known in the art.

BRI/BLRI Test Procedure

A PB-900™ Programmable JarTester manufactured by Phipps & Bird, Inc., of Richmomd, Va., with 2 beakers is used. The diameter of the beakers is 11.4 cm (4.5") and the height is 15.3 cm (6"). Each beaker contains 500 mL of contaminated water and a stirrer that is rotated at 60 rpm. The stirrers are stainless steel paddles 7.6 cm (3") in length, 2.54cm (1") in height, and 0.24 cm (3/32") in thickness. The stirrers are placed 0.5 cm (3/16") from the bottom of the beakers. The first beaker contains no filter material and is used as a control, and the second beaker contains a sufficient quantity of the filter material so that there is a total external geometric surface area of 1400 cm² in the second beaker. For example, if the filter material of Example 1 is tested, 1.5 g of the AL coated glass fiber particles are placed in the second beaker. This amount is calculated based on the density of the fibers (i.e., 2.6 g/cm³) and heir diameter (i.e., 15.8 µm), so that the total external geometric surface area is about 1400 cm². Duplicate samples of water, 5 mL in volume each, are collected from each beaker for assay at the following times after insertion of the AL coated glass fiber filter particles in the second beaker: 0, 2, 4 and 6 hours. Other equipment can be substituted as known in the art.

The $E.\ coli$ bacteria used are the ATCC # 25922 (American Type Culture Collection, Rockville, Md.). The target $E.\ coli$ concentration in the control beaker is set to be between $2.0 \times 10^9$ CFU/L and $1.0 \times 10^9$ CFU/L. The $E.\ coli$ assay can be conducted using the membrane filter technique according to method # 9222 of the 20$^{th}$ edition of the "*Standard Methods for the Examination of Water and Wastewater*" published by the American Public Health Association (APHA), Washington, DC. The limit of detection (LOD) is $1 \times 10^3$ CFU/L. Other assays for determining the $E.\ coli$ concentration can be substituted as known in the art.

Figure 4:
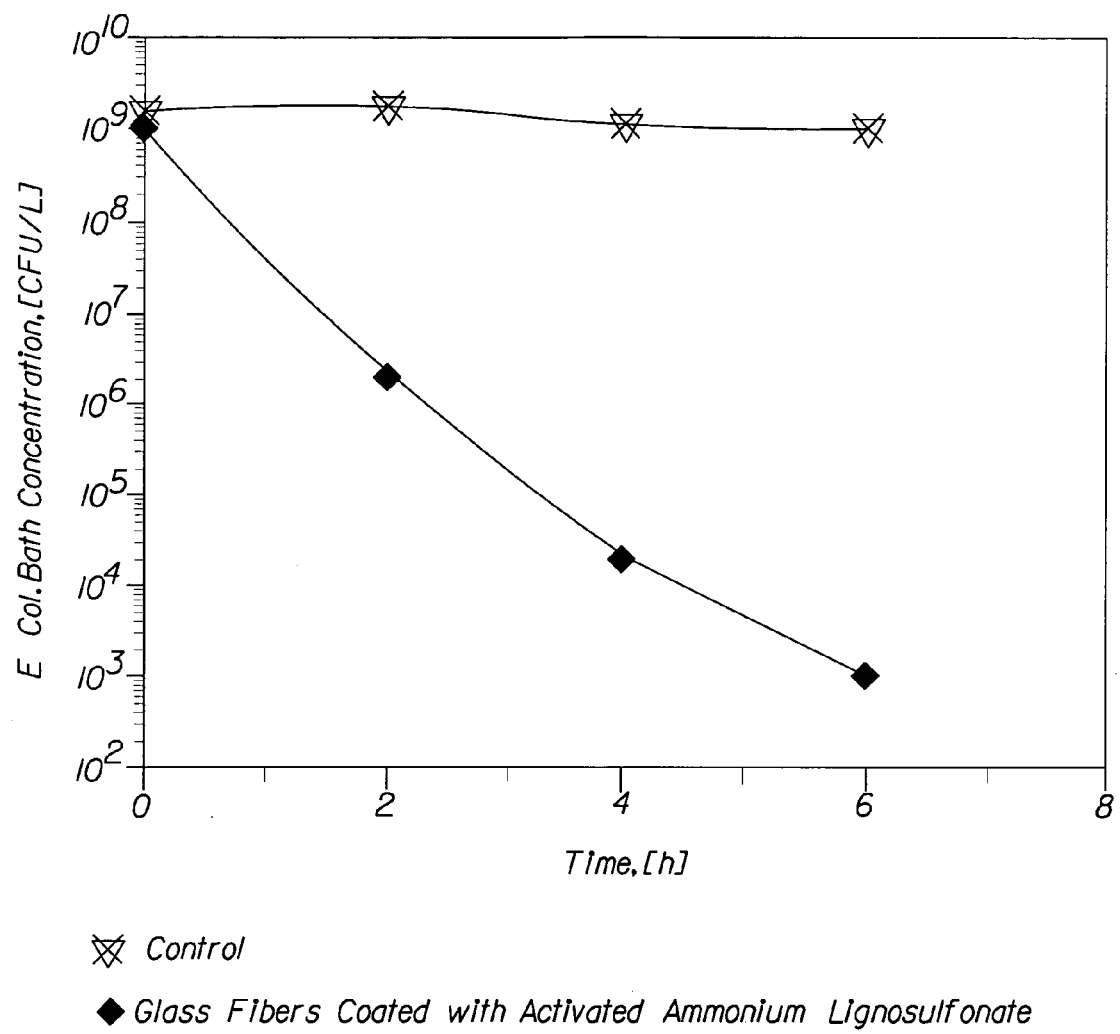
FIG. 4 illustrates the E. coli bath concentration as a function of time for the glass fibers of FIG. 1.

Exemplary BRI/BLRI results for the filter material of Example 1 are shown in FIG. 4. The $E.\ coli$ concentration in the control beaker at 6 hours is $1.1 \times 10^9$ CFU/L, and that in the second beaker containing the AL coated glass fiber filter particles is less than the LOD. The BRI is then calculated as greater than 99.9999%, and the BLRI is calculated as greater than 6 log.

VRI/VLRI Test Procedure

The testing equipment and the procedure are the same as in BRI/BLRI procedure. The first beaker contains no filter material and is used as control, and the second beaker contains a sufficient quantity of the filter material so that there is a total external geometric surface area of 1400 cm² in the second beaker. For example, if the filter material is that of Example 2, 1.5 g of the zinc coated glass fiber particles are placed in the second beaker. This amount is calculated based on the density of the fibers (i.e., 2.6 g/cm³)

and their diameter (i.e., 15.8 μm), so that the total external geometric surface area is about 1400 cm$^2$.

The MS-2 bacteriophages used are the ATCC # 15597B from the American Type Culture Collection of Rockville, Md. The target MS-2 concentration in the control beaker is set to be between $2.0\times10^9$ PFU/L and $1.0\times10^9$ PFU/L. The MS-2 can be assayed according to the procedure by C. J. Hurst, *Appl. Environ. Microbiol.*, 60(9), 3462(1994). Other assays known in the art can be substituted. The limit of detection (LOD) is $\times10^3$ PFU/L.

Figure 5:
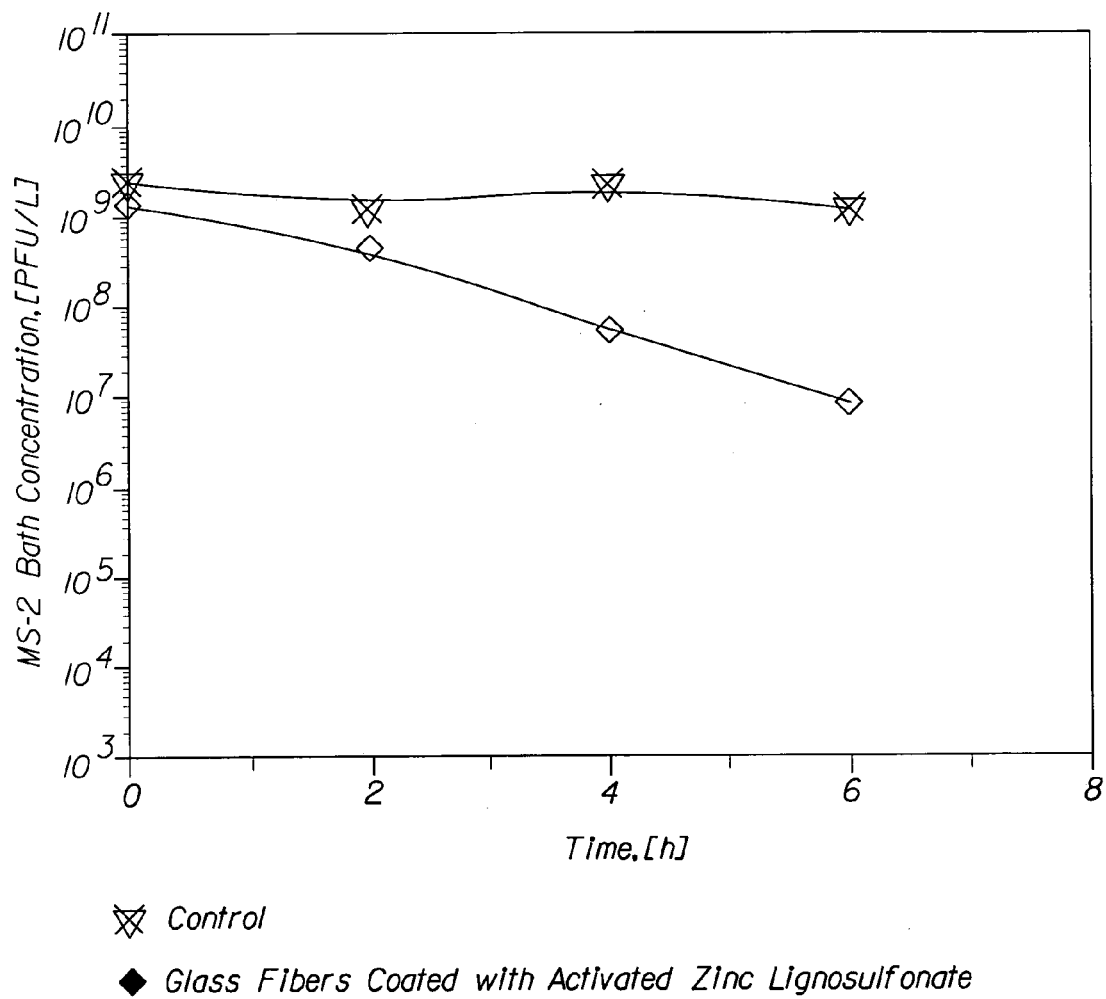
FIG. 5 illustrates the MS-2 bath concentration as a function of time for glass fibers coated with an activated zinc lignosulfonate.

Exemplary VRI/VLRI results for the filter material of Example 2 are shown in FIG. 5. The MS-2 concentration in the control beaker at 6 hours is $1.1\times10^9$ PFU/L, and in the second beaker containing the ZL coated glass fiber particles is $8.1\times10^6$ PFU/L. The VRI is then calculated as equal to 99.3%, and the VLRI is calculated as equal to 2.13 log.

The embodiments described herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for forming a filter material, comprising the steps of:
   a) applying an aqueous lignosulfonate coating onto a filter particle;
   b) carbonizing said coating; and
   c) activating said coating.

2. The process of claim 1, wherein said lignosulfonate is selected from the group consisting of ammonium lignosulfonate, zinc lignosulfonate, calcium lignosulfonate, ferric lignosulfonate, magnesium lignosulfonate, chromium lignosulfonate, manganese lignosulfonate, copper lignosulfonate, and mixtures thereof.

3. The process of claim 1, wherein said filter particle comprises a glass fiber.

4. The process of claim 1, wherein said filter material comprises a screen, a ceramic fiber, a woven, a non-woven, or mixtures thereof.

5. The process of claim 1, further comprising the step of drying said coating.

6. The process of claim 1, wherein the coating add-on before carbonization is between about 0.5% and about 97%.

7. The process of claim 1, wherein the carbon add-on in the carbonized coating is between about 0.2% and about 95%.

8. The process of claim 1, wherein the carbon add-on in the activated coating is between about 0.1% and about 85%.

9. The process of claim 1, wherein the temperature during said step of carbonization is between 600° C. and about 900° C.

10. The process of claim 1, wherein the temperature during said step of activation is between about 550° C. and about 1300° C.

11. The process of claim 1, wherein the BET surface area of said filter particle after the activation step is between about 500 m$^2$/g and about 3000 m$^2$/g.

12. The process of claim 1, wherein the suni of mesopore and macropore volumes of said filter particle is between about 0.2 mL/g and about 2.2 mL/g.

13. The process of claim 1, wherein the ratio of the sum of mesopore and macropore volumes to micropore volume is between about 0.3 and about 3.

14. A process for forming a filter material, consisting of:
   a) coating a filter particle with a lignosulfonate;
   b) drying said coating;
   c) carbonizing the coating at a temperature from 600° C. to about 900° C.; and
   d) activating the coating.

15. The process according to claim 14, wherein the lignosulfonate is selected from the group consisting of ammonium lignosulfonate, zinc lignosulfonate, calcium lignosulfonate, ferric lignosulfonate, magnesium lignosulfonate, chromium lignosulfonate, manganese lignosulfonate, copper lignosulfonate, and mixtures thereof.

16. The process according to claim 14, wherein the step of carbonizing the coating is at a temperature from about 630° C. to about 800° C.

17. A process for forming a filter material, comprising:
   a) forming an aqueous lignosulfonate solution;
   b) mixing the aqueous lignosulfonate solution with filter particles to form aqueous lignosulfonate-coated filter particles;
   c) drying the aqueous lignosulfonate-coated filter particles;
   d) carbonizing the aqueous lignosulfonate-coated filter particles in a furnace at a temperature from 600° C. to about 900° C.; and
   e) activating the carbonized, aqueous lignosulfonate-coated filter particles in a furnace.

* * * * *

UNITED STATES PATENT AND TRADEMARK OFFICE
CERTIFICATE OF CORRECTION

PATENT NO. : 7,186,441 B2  
APPLICATION NO. : 10/771778  
DATED : March 6, 2007  
INVENTOR(S) : Michael Donovan Mitchell et al.

It is certified that error appears in the above-identified patent and that said Letters Patent is hereby corrected as shown below:

On Title Page

Abstract
    Item (57) Line 15 of Abstract, delete "70°" and insert -- 700° --.

Column 1
    Line 32, please delete "modem" and insert -- modern --.

Column 9
    Line 26, please delete "6/Dß" and insert -- 6/D$p$ --.

Column 9
    Line 27, please delete "ß" and insert -- $p$ --.

Column 10
    Line 58, please delete "Owe,is" and insert -- Owens --.

Signed and Sealed this

Eighteenth Day of December, 2007

JON W. DUDAS  
*Director of the United States Patent and Trademark Office*